March 11, 1958 G. A. BRILLINGER 2,826,667
DEVICE FOR MELTING AND REMOVING FUSIBLE METAL
Filed April 23, 1956
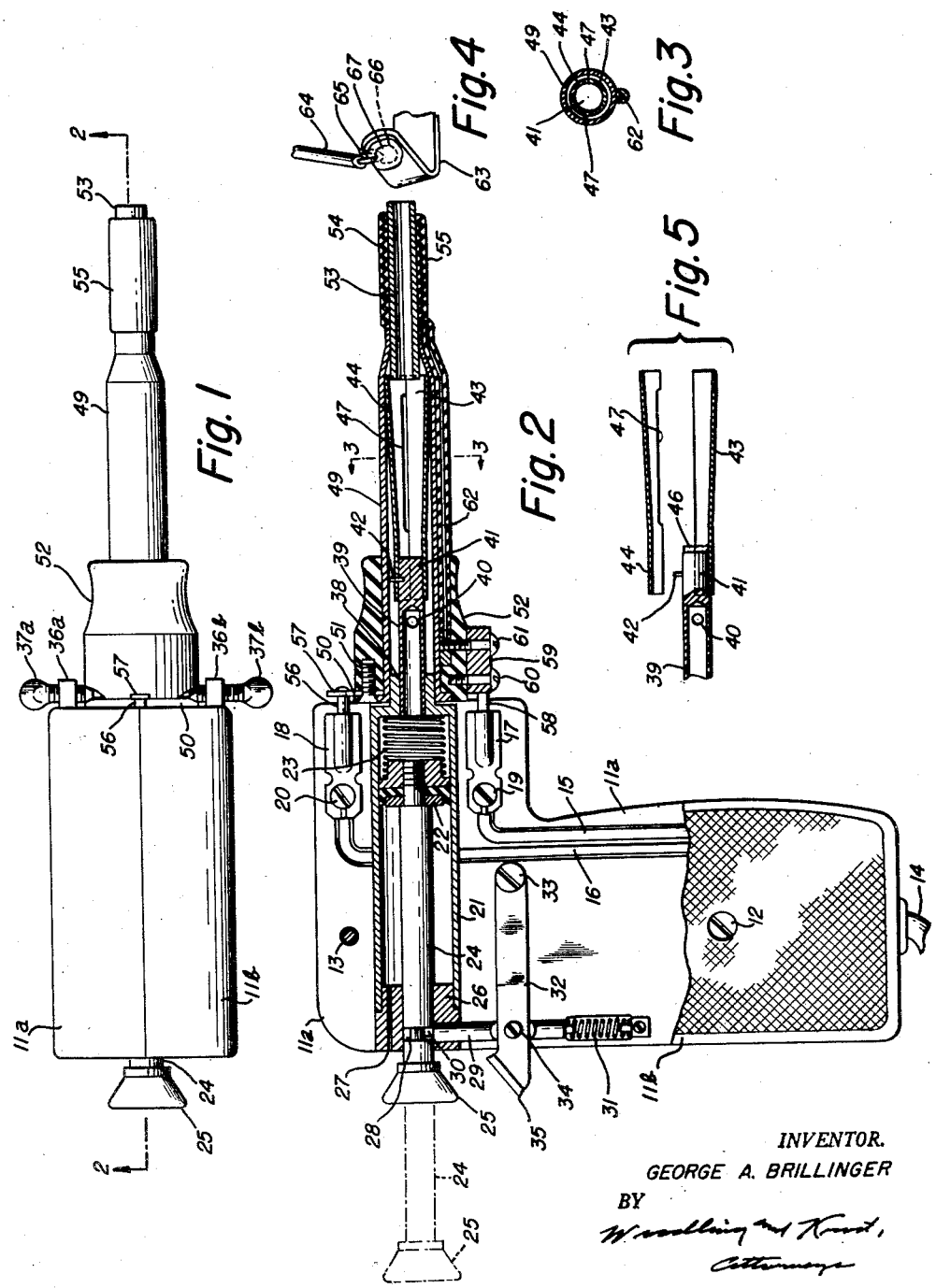
INVENTOR.
GEORGE A. BRILLINGER
BY

United States Patent Office 2,826,667
Patented Mar. 11, 1958

2,826,667

DEVICE FOR MELTING AND REMOVING FUSIBLE METAL

George A. Brillinger, Fairview Park, Ohio

Application April 23, 1956, Serial No. 579,878

10 Claims. (Cl. 219—21)

My invention relates to devices for melting and removing fusible metal.

An object of my invention is to provide a tool which may be used for melting fusible metal, such as solder, in a usual soldering operation and also used for melting such metal and the removal of the molten metal.

Another object is the provision of a tool for removing solder from a soldered connection, such as between a terminal clip and a wire.

In the reconstruction and repair of many electrical appliances and devices, it is often necessary to remove components which are electrically connected by solder to electric conductors. If the body of solder at the connection if merely melted, it sometimes drops down into other parts of the appliance to cause electrical short-circuits or other undesirable results. Attempts are sometimes made to pick the mass of solder from the connection but this is difficult and very often impossible to do without injury to the parts or without leaving an undesired residue of solder at the connection.

My tool can be used alone as an ordinary soldering tool for melting solder at the location of a connection to leave the usual solder body at the connection between a terminal clip, for example, and a conductor, such as a wire. My tool may also be used, and has its most important utility, in the removal of a mass or body of solid solder at the electrical connection between two elements. In such a use, my tool first melts the metal and then by manipulation of the actuating mechanism of the tool, removes the solder while in a molten state from the connection to leave the element of the connection free and clear of the solder so that the elements, such as a terminal clip and a wire, may be quickly and easily separated.

It is an object of this invention to provide an efficient and useful tool for accomplishing the foregoing results.

Another object is to provide a tool operating in a manner not heretofore known and to provide results not heretofore obtainable.

Other objects and a fuller understanding of this invention may be had by referring to the following description and claims, taken in conjunction with the accompanying drawing, in which:

Figure 1 is a top plan view of a device embodying my invention;

Figure 2 is a longitudinal sectional view of my device taken through the line 2—2 of Figure 1;

Figure 3 is a cross-sectional view taken through the line 3—3 of Figure 2;

Figure 4 is a view showing a typical electrical connection from which soldering is to be removed and shown positioned adjacent the forward end of the tool shown in Figure 2; and Figure 5 is a detailed view, partly in section, showing the construction of the collector for molten solder and showing the parts thereof in exploded or separated arrangement.

My device has a handle member or support made up of two similar halves or parts 11–a and 11–b. The two parts 11–a and 11–b are made of a suitable heat- and electrical-insulating material, such as hard rubber or the like, and are joined together by a screw bolt 12 and a screw bolt 13 to provide the complete handle or support member. An electric cord 14 extending from the handle is adapted to be connected to a source of electric energy. Within the handle and between the two halves, the cord 14 is separated into a first electric wire 15 and a second electric wire 16, which first and second wires carry the electric current from the cord 14 through the handle. The electric wire 15 is electrically connected to a plug receptacle 17, which is resiliently yieldable to receive an electric pin or plug in the usual manner. The screw bolt 19 holds the receptacle 17 in position and also provides the electrical connection between the metal receptacle 17 and the wire 15. The electric wire 16 is electrically connected with the metal receptacle 18, which is also resiliently yieldable to receive an electric pin or plug in the usual manner. The screw bolt 20 secures the receptacle 18 in position and also provides the electrical connection between the wire 16 and the receptacle 18.

Positioned between the two halves 11–a and 11–b of the handle and extending longitudinally of the tool is a cylinder 21. Reciprocal with the cylinder 21 is a piston 22 having the usual sealing arrangement with the walls of the cylinder. Positioned between the forward end of the cylinder 21 and the piston 22 is an expansion coil spring 23 which is biased to resiliently urge the piston 22 to a retracted position in the cylinder. In the position shown in Figure 2, the piston is in its forward position and the spring 23 is under compression. In the absence of any opposition, the spring 23 quickly moves the piston to a retracted position in the cylinder, that is, toward the left-hand end of the gun, as seen in Figure 2.

A piston stem 24 extends rearwardly from the piston 22 and protrudes outwardly through an opening in an end plug 26 mounted to the rearward end of the cylinder 21. The stem 24 is in a sliding fit with the plug 26. A knob 25 is provided on the rearward end of the piston stem 24, this knob 25 being adapted to be pressed by the hand or thumb of the operator to push the stem 24 and the piston 22 forwardly in the cylinder 21 and against the force of the spring 23 toward its advanced position illustrated in Figure 2. An air vent 27 in the end plug 26 permits air in the rearward end of the cylinder 21 to be readily vented or exhausted from the cylinder upon movement of the piston 22 to its retracted position.

Adjacent the rearward end of the piston stem 24, there is provided in the stem an annular groove 28 which extends circumferentially around the stem 24. A catch rod 29 is positioned in the handle between the two halves 11–a and 11–b at right angles to the piston stem 24 and the catch rod 29 is reciprocal toward and away from the axis of the piston stem 24. The catch rod 29 has a tongue portion 30 provided at its free end, which tongue portion is adapted to enter and engage within the groove 28 on the stem 24. Upon movement of the catch rod 29 away from the stem 24, the tongue 30 disengages from the groove 28 and frees the stem 24 for movement along its axis. However, upon insertion of the tongue portion 30 in the groove 28, the stem 24 is locked in the advance position illustrated in Figure 2.

A small expansion coil spring 31 positioned in the handle resiliently urges the catch rod 29 upwardly toward the piston stem 24. For actuating the catch rod 29 so as to oppose the spring 31 and to move the tongue portion 30 out of the groove 28, a lever 32 is provided. This lever 32 is pivoted on a screw bolt 33 attached to the handle and a pivot connection is provided by a screw bolt 34 between the catch rod 29 and the lever 32. There is a thumb-engaging button 35 provided on the end of the lever 32 which extends rearwardly from the handle. Upon pressing the button 35 downwardly, the spring 31 is overcome, the rod 29 is moved downwardly, and the tongue 30 is disengaged from the groove 28 of the piston stem 24.

Extending forwardly from the handle and on opposite sides thereof are two internally threaded extending portions 36–a and 36–b, as seen in Figure 1. The extending portion 36–a is carried by the part 11–a of the handle and the extending portion 36–b is carried by the part 11–b of the handle. These extending portions 36–a and 36–b are disposed in a substantially flat horizontal plane passing through the axis of the cylinder 21 and have internally threaded openings directed radially of that axis. A threaded screw bolt 37–a threadably engages in the extending portion 36–a and a screw bolt 37–b threadably engages in the extending portion 36–b. The bolts 37–a and 37–b are of the thumb-screw type so as to be readily turned by hand.

The cylinder 21 has extending from its forward wall an annular projecting portion 38, which provides a round flange concentric with the axis of the cylinder 21. Positioned within this projection portion 38 and in a press fit therewith is a pipe or conduit 39, which protrudes forwardly from the portion 28 and is also disposed concentric with the axis of the cylinder 21. There are two oppositely disposed openings 40 extending through the wall of the conduit 39 so as to provide communication through the conduit adjacent the forward end thereof.

Carried by the conduit 39 at its forward end is a baffle member or collector 41. This baffle member 41 is in the form of a plug closing the forward end of the conduit 39 and has shield portions 43 and 44 extending forwardly and radially outward from the round plug portion at the end of the conduit 39. The one shield portion 43 is bonded or otherwise secured to the plugged end of the conduit 39. The other shield portion 44 is detachably carried by the plugged portion at the end of the conduit 39. This shield portion 44 has a small hole 45 which accommodates a small pin 42 protruding radially outward from the plug portion of the baffle or collector 41. Adjacent the plugged end of the baffle or collector 41 the shield portions 43 and 44 are semi-cylindrical so that together they form a partial cylinder. The forward ends of the shield portions 43 and 44 are flared outwardly so that the baffle or collector 41, including the shield portions 43 and 44, is in the shape of a horn, the concavity of which is directed forwardly of the device.

The shield portion 44 is cut away on opposite sides of the longitudinal axis of the collector or baffle to provide open spaces 47 through the shield portion of the collector or baffle, these open spaces 47 being disposed forwardly of the closed rearward end of the collector or baffle.

An elongated hollow member 49 of a suitable metal has a metal flange 50 at its rearward end. This flange 50 of the hollow member 49 is secured to the handle of the tool by the ends of the thumb screws 37–a and 37–b which overlap the flange 50. The hollow member 49 is also readily detached from the handle by turning the screws 37–a and 37–b away from the flange 50 so as to permit the ready removal of the hollow member 49 with its flange 50 from the handle made up of parts 11–a and 11–b. Surrounding the rearward portion of the hollow member 49 and adjacent the flange 50 is a ring base portion 52 of suitable heat- and electrical-insulating material, such as hard rubber or the like. This ring base portion 52 is fitted tightly around the hollow member 49 and is secured by screws to the flange 50 of the hollow member 49.

At the forward end of the hollow member 49 there is a tubular portion 53. This tubular portion 53 is preferably made of copper or other metal particularly adapted to be heated and to impart heat. Preferably the hollow member 49 is compressed to tightly engage and support the tubular member 53. The hollow member 49 and tubular member 53 are concentric with the same axis and in effect together form an elongated hollow member or tube which extends forwardly from the handle of the device as the barrel of a gun with the portion 53 being disposed at the muzzle end of the barrel.

An electrical resistance heating coil 54 imbedded in a suitable ceramic insulating material 55 encircles the tubular portion 53 in a manner to impart heat to the tubular portion 53 upon electrical energization of the electrical heating coil 54. The forward end of the tubular portion 53 extends outwardly a small distance from the cylindrically shaped heating element.

An electric plug or pin 56 is carried by an electrical connecting member 57 adjacent the rearward end of the hollow member 49. This plug or pin 56 slidably fits within the spring receptacle 18 so as to provide an electrical connection between the receptacle 18 and the pin 56. The electrical connecting member 57 is electrically connected to the metal hollow member 49 which acts as an electrical conductor for one terminal of the electrical heating coil 54. The screw 51 extends through the flange 50, the electrical connecting member 57 and into the ring base portion 52 so as to hold the pin 56 in a position parallel to the axis of the hollow member 49.

Another electric plug or pin 58 is carried by an electrical connecting member 59, which electrical connecting member is secured to the ring base portion 52 by a screw bolt 60. A screw bolt 61 provides electrical connection between the electrical connecting member 59 and an insulated wire 62 which extends longitudinally of the hollow member 49 along the lower portion thereof from the bolt 61 to the other terminal of the electrical heating coil 54. Thus, the heating coil 54 may be energized by electric current passing from the receptacle 18, through the pin 56, the electrical connecting member 57 and the hollow member 49 to one of the terminals of the heating coil 54 and by electric energy from the receptacle 17 through the pin 58, the electrical connecting member 59, the screw bolt 61 and the insulated wire 62 to the other terminal of the heating coil 54.

It is seen that upon withdrawal of the screw bolts 37–a and 37–b from engagement with the flange 50, the hollow member 49 and parts carried thereby may be removed from the handle. Upon forward movement of the hollow member 49 and parts carried thereby, the pins 56 and 58 are retracted from the receptaacles 18 and 17, respectively. Also the hollow member 49 and parts carried thereby may be readily reassembled with the handle so as to align the parts in the position shown in Figure 2 and to insert the pins 56 and 58 in the receptacles 18 and 17, respectively.

A typical electric connection as found in many electrical appliances and devices is illustrated in Figure 4. A terminal clip 63 has a hole 66 formed adjacent the end thereof. An electric wire 64 having a hooked end 65 is extended through the hole 66 so as to position the uninsulated hooked end portion 65 in electrical engagement with the terminal clip 63. The insulation on the wire 64 is absent at the point of engagement between the hooked end portion 65 and the terminal 63. A body or mass of solder 67, that is, a fusible metal, is positioned on the terminal clip 63 so as to imbed the end 65 of the wire, to fill the hole 66, and to secure the wire and terminal in good electrical connection. To properly disengage the wire 65 from the terminal clip 63, it is desired that the mass or body of solid solder 67 be substantially completely removed from the connection so as to leave only the wire and the terminal clip.

Upon energizing the heating coil 54 and by bringing the forward end of the tubular portion 53 against or in juxtaposition to the solder 67, the solder is melted by the heat imparted thereto. At this time, the device should be in a cocked position, as illustrated in Figure 2, that is, with the piston 22 moved to its advanced position and held there by the tongue 30 in the groove 28. As soon as the solder 67 is melted, the button 35 is depressed by the thumb of the operator to release the piston. The spring 23 quickly and immediately retracts the piston 22 so that air is drawn into the cylinder on the side of the piston in which the spring 23 is located. Inasmuch as this end of the cylinder 21 is in communication with the forward open end of the elongated hollow member through the conduit 39, the openings 40, and the bore of the barrel or tube made up of members 49 and 53, air is moved rapidly from the forward open end rearwardly in the bore toward the cylinder. The vacuum created by the retracting piston creates a vacuum in the bore in its rearward portion and adjacent the openings 40.

With the forward end of the device held closely against the melted solder 66 and with the sudden movement of air into the bore of the device and rearward through the bore, particles or droplets of the melted solder are carried by the moving air rearwardly through the bore and in the direction of the cylinder.

To collect the particles or droplets of melted solder and to prevent them from falling into the passageways through which air is drawn by the retracting piston in the cylinder 21, the collector 41 is positioned athwart the path of the air and transversely of the axis of the bore. The particles or droplets of molten solder form a deposit 46 in the forward end of the cylindrical plug portion of the collector, this deposit 46 being illustrated in Figure 5. The shield portions 43 and 44 help guide the droplets or particles of solder to collect where they form the deposit 46. Air leaks around the collector by passing around the crack or space at the forward edge of the shield portions 43 and 44, and the air also leaks through the open spaces 47 provided on opposite sides of the collector formed by the shield portions 43 and 44. By the arrangement shown, air may move rapidly back through the bore to by-pass the collector, but the particles of solder carried by the air and moving in a straight path along the axis of the bore are collected at the central portion of the collector.

By having the one shield portion 44 readily removable upon disassembly of the device, the deposit 46 may be readily flicked or scraped off from the central rearward part of the collector upon the deposit building up to an undesired degree. The by-passing of the air around the collector is balanced by having the air move radially outward from the axis of the bore and on opposite sides of the axis. Thus, the by-passing of the air tends to be distributed around the collector and not merely on one side thereof.

It is found that with my improved device, soldered connections may readily have the solder removed therefrom with a minimum of effort and with a maximum of speed. The parts are substantially clean of solder and the elements may be readily separated after the removal of the solder with my device. The same device may be used as a usual soldering tool for again soldering the parts together in a desired electrical connection, such as again soldering the wire 65 to the terminal clip 63.

The present disclosure includes that contained in the appended claims, as well as that of the foregoing description.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed.

What is claimed is:

1. A tool for melting and for removing molten solder comprising in combination a handle member, an elongated hollow member carried by the handle member, said hollow member having a forward open end and a forward end portion adapted to be heated for melting solder located near said forward end, electrical heating means mounted to said hollow member for heating said forward end portion, said hollow member having an internal chamber disposed intermediate the ends of said hollow member, a baffle member positioned in said chamber and disposed transversely thereof, said baffle being arranged in said chamber relative to the walls thereof to permit the lateral by-passing of air moving through the chamber from said forward open end around the baffle and rearwardly thereof, a cylinder in communication with said chamber rearwardly of said baffle member, a piston reciprocal in said cylinder, spring means for urging the piston in the cylinder to a retracted position, an actuating member operatively connected to the said piston for moving it in opposition to said spring means to an advance position, a catch member associated with said actuating member for selectively holding the piston in advance position, and electrical conductor means carried by the tool and adapted to be connected to a source of electrical energy for conducting electrical current to said electrical heating means, movement of the piston in the cylinder to its advanced position by the actuating member and its retraction to retracted position by the said spring means upon its release by said catch member creating a vacuum in said chamber, said vacuum being adapted to suck molten solder through said forward end of the hollow member into said chamber to impinge on said baffle member.

2. A tool for melting and for removing molten solder comprising in combination an elongated hollow member having an open forward end, electrical heating means carried by the hollow member adjacent its forward end for heating the hollow member to melt solder in juxtaposition to said forward end, a baffle member positioned within the bore of said hollow member at a position rearwardly of said forward end, by-pass means providing passageway for air through the bore around and past the baffle member, a piston and cylinder assembly communicating with said bore at a location rearwardly of said baffle member, and actuating means for operating said piston to draw air through said forward end and through the hollow member toward said cylinder, said drawing of air sucking molten solder through said forward end and through the hollow member to impinge on said baffle member.

3. In a tool for melting and removing solder, the combination of a pistol handle member, a tubular member carried by the handle member and extending forwardly therefrom, electrical heating means carried by the tubular member for heating the tubular member to melt solder, said tubular member having an open bore extending from the open muzzle end of the tool, a piston and cylinder assembly carried by the handle member, conduit means providing communication between said cylinder and said bore at a location rearwardly of said forward end, actuating means for operating the piston in said cylinder to draw air through the tubular member from the open muzzle end thereof toward said cylinder, and a baffle member positioned in the tubular member intermediate of said open muzzle end and said location and athwart the path of air drawn through the tubular member to collect molten solder carried by said drawn air prior to entry into said conduit means at said location, said baffle member and the wall of the tubular member laterally outward of the baffle member being spaced from each other to permit air moving through the tubular member from the open muzzle end thereof to laterally by-pass said baffle member.

4. A tool for melting and removing fusible metal comprising in combination a pistol handle member, a hollow barrel member carried by and extending forwardly from the handle member, the muzzle end of the barrel member being open, an electric heating element carried by the barrel member adjacent said nozzle end for heating the barrel member, said barrel member upon being heated being adapted to provide heat for melting fusible metal in juxtaposition to said muzzle end, a piston and cylinder assembly carried by the handle member and communicating with the bore of the barrel member at a location rearwardly of said muzzle end, said piston being biased to move to retracted position for creating a vacuum in said barrel member at said location, actuating means for moving said piston to advanced position, release means for releasing said piston to move to retracted position, a collector member positioned within said barrel member in the path of air moved through the barrel member by said vacuum from said open muzzle end toward said location to collect melted metal carried by said moved air from juxtaposition to said muzzle end, and by-pass means disposed radially outward of said collector member to permit air to move through the barrel member toward said location.

5. A tool for melting fusible metal located at a position and for removing the melted metal from said position, comprising in combination support means, electrical heating means carried by the support means for melting the fusible metal at said position, chamber means carried by said support means and having an open end, said open end being adapted to be placed in juxtaposition to the position of said fusible metal, suction means for moving air through the chamber means from said open end toward a location in the chamber means spaced from said open end, and a collector positioned in said chamber means intermediate said forward end and said location and athwart the path of air moved from said forward end to said location, said collector baffling the air moved in said path through the chamber means to collect particles of molten metal carried by the air from said position through the forward end toward said location, said collector being positioned in said chamber means to permit air moved through the chamber means to flow past the collector from said forward end to said location.

6. A tool for melting and withdrawing a body of fusible metal comprising in combination, a handle member, an elongated hollow casing having an opening at a forward end, electrical heating means carried by the casing adjacent its forward end to heat the casing for the melting of said metal, said casing having a straight chamber axially aligned with said opening, said chamber having a port positioned rearwardly of said opening, a cylinder, a piston reciprocal in said cylinder and arranged upon retracting movement to draw air into the cylinder on a first side of the piston and to discharge to atmosphere air from the cylinder on the other side of the piston, said cylinder on said first side of the piston being in communication with said port, spring means for retractably moving said piston in the cylinder, latch means for holding the piston in advanced position in opposition to said spring means, and a collecting member positioned in said straight chamber at the axis thereof and intermediate said opening and said port to meet air moved rearwardly through the hollow casing from said opening toward said port, said collecting member and the wall of said chamber radially outwardly of said collecting member having space therebetween to permit the flow of air through the chamber past the collecting member, molten metal melted by the casing adjacent the forward end and drawn into the casing through said opening by said moving air being collected on said collecting member, movement of the piston to advanced position in the cylinder and subsequent release of the piston by the latch means providing for the said rearward movement of air through the casing.

7. A device for melting fusible metal and for removing the melted metal comprising a supporting member, a piston and cylinder assembly carried by the supporting member, actuating means carried by the supporting member for actuating said piston to create a vacuum in the cylinder on one side of the piston, a conduit carried by the supporting member and communicating with said cylinder on said one side of the piston, first electrical connecting means carried by the supporting member and adapted to be connected to a source of electrical energy, an elongated hollow member detachably carried by said supporting member, said hollow member having a forward open end and an elongated chamber rearwardly of said forward open end, the longitudinal axis of said chamber extending through said forward open end, electrical heating means carried by the hollow member and adapted to heat the hollow member adjacent the forward end thereof for melting said fusible metal, second electrical connecting means carried by the hollow member and electrically connected to said heating means, said first and second electrical connecting means being electrically interengageable and disengageable upon attachment and detachment of the hollow member to the supporting member, said conduit being adapted, upon attachment of said hollow member to said support member, to communicate with said chamber at a location spaced rearwardly from said forward open end, and a baffle member positioned within said chamber athwart the said longitudinal axis of the chamber forwardly of said location and rearwardly of said forward open end, the chamber forwardly of said baffle member and on opposite sides of said longitudinal axis being in communication with said chamber at said location to permit air to by-pass the baffle member on opposite radially disposed sides of the baffle member in moving through the chamber from said open forward end toward said location, said baffle member being adapted to meet molten metal carried by air moving through the chamber from said forward end toward said location.

8. A device for melting fusible metal and for removing the melted metal comprising a supporting member, a piston and cylinder assembly carried by the supporting member, actuating means carried by the supporting member for actuating said piston to create a vacuum in the cylinder on one side of the piston, a conduit carried by the supporting member and communicating with said cylinder on said one side of the piston, first electrical connecting means carried by the supporting member and adapted to be connected to a source of electrical energy, an elongated hollow member detachably carried by said supporting member, said hollow member having a forward open end and an elongated chamber rearwardly of said forward open end, the longitudinal axis of said chamber extending through said forward open end, electrical heating means carried by the hollow member and adapted to heat the hollow member adjacent the forward end thereof for melting said fusible metal, second electrical connecting means carried by the hollow member and electrically connected to said heating means, said first and second electrical connecting means being electrically interengageable and disengageable upon attachment and detachment of the hollow member to the supporting member, said conduit extending forwardly from said supporting member and adapted to extend into said chamber and to communicate therewith upon attachment of the hollow member to the supporting member, and a baffle member carried by said conduit to be disposed transversely of the said longitudinal axis of said chamber to encounter air moving longitudinally through the chamber from said forward open end, said chamber providing a by-pass radially outward of said baffle member to permit air to move past and rearwardly of the baffle member to enter said conduit, molten metal carried by said moving air through the said chamber impinging on said baxe member.

9. In a soldering tool having a longitudinal bore extending rearwardly thereof from a forward open end thereof, the longitudinal axis of said bore extending through said forward open end, apparatus for removing molten metal from adjacent said forward end comprising in combination, a heating element extending from said tool to melt metal adjacent said forward end, a piston and cylinder carried by the tool and adapted to draw air through said bore into said cylinder upon movement of the piston in one direction, said drawn air being adapted to carry particles of molten metal melted by said heating element from adjacent said forward end into the bore, and a baffle member positioned intermediate the ends of said bore and athwart the axis thereof to encounter air drawn through the said bore and to meet said particles of metal carried thereby, said baffle member being spaced from the longitudinal walls of the bore on opposite sides of the baffle member to permit air to move radially outward and past the baffle member on opposite radial sides thereof and to said cylinder.

10. In a soldering tool having a longitudinal bore extending rearwardly thereof from a forward open end thereof, the longitudinal axis of said bore extending through said forward open end, apparatus for removing molten metal from adjacent said forward end comprising in combination, a heating element extending from said tool to melt metal adjacent said forward end, a piston and cylinder carried by the tool and adapted to draw air through said bore into said cylinder upon movement of the piston in one direction, said drawn air being adapted to carry particles of molten metal melted by said heating element from adjacent said forward end into the bore, and a baffle member substantially centrally disposed in said bore and transversely of said longitudinal axis to encounter air moved through the bore by said piston and cylinder, said baffle member having a shield portion extending forwardly and radially outward toward the wall of said bore, said baffle member and the wall of said bore being spaced to permit air to move radially outward of the shield portion and rearwardly in the said bore past the baffle member on radially opposite sides of the baffle member, said baffle member being adapted to collect molten metal carried by air moving through the bore from said forward open end.

References Cited in the file of this patent
UNITED STATES PATENTS

| | | |
|---|---|---|
| 2,452,360 | Dunham | Oct. 26, 1948 |
| 2,609,778 | Bleam et al. | Sept. 9, 1952 |